No. 895,991. PATENTED AUG. 11, 1908.
A. H. EMERY.
HYDRAULIC PRESSURE MEASURING APPARATUS.
APPLICATION FILED AUG. 6, 1906.
8 SHEETS—SHEET 1.
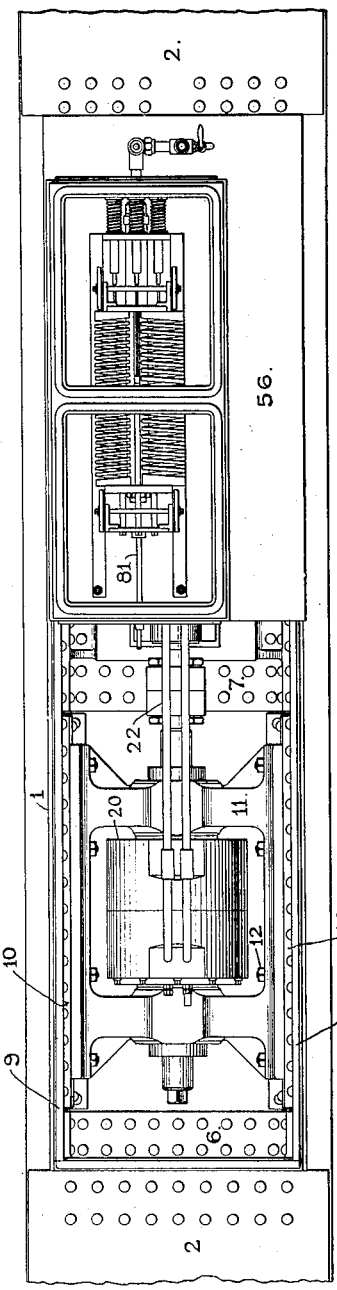
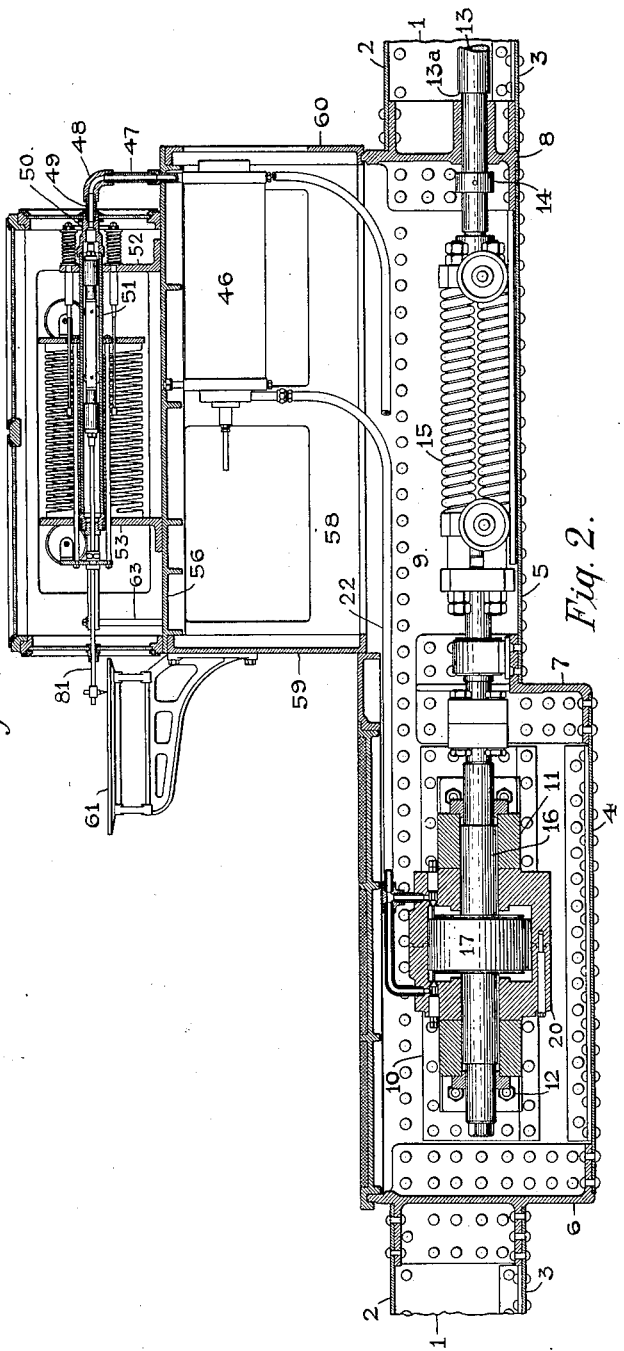
Witnesses
H. A. Totten
J. M. Stynkoop
Inventor
Albert H. Emery,
By Knight Bros,
Attorneys.

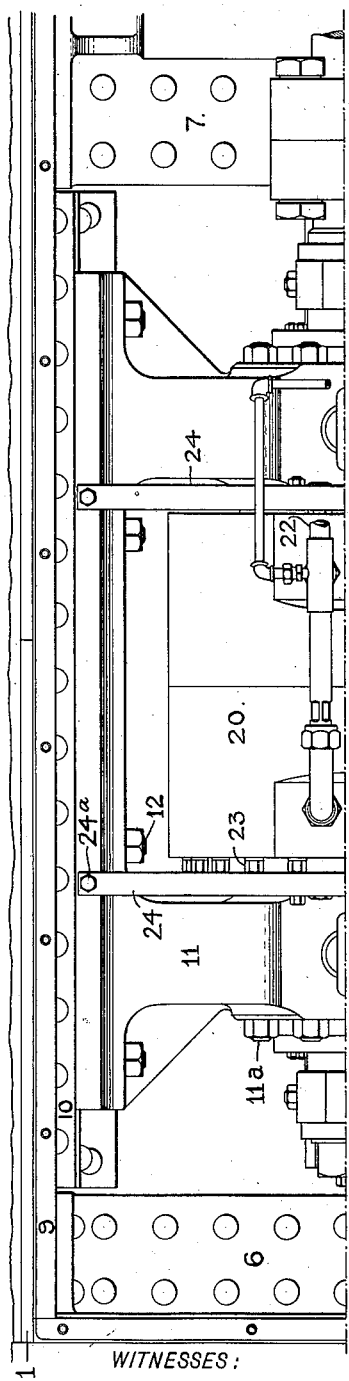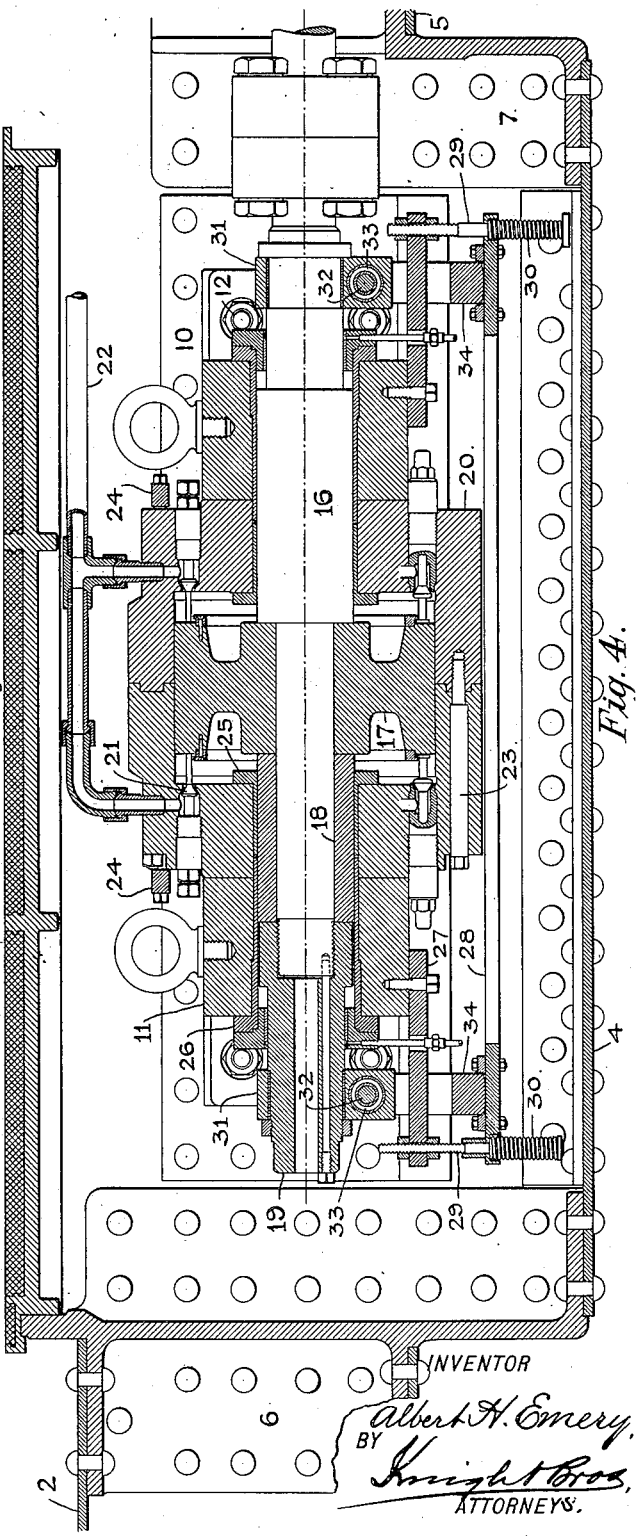

No. 895,991. PATENTED AUG. 11, 1908.
A. H. EMERY.
HYDRAULIC PRESSURE MEASURING APPARATUS.
APPLICATION FILED AUG. 6, 1906.
8 SHEETS—SHEET 3.
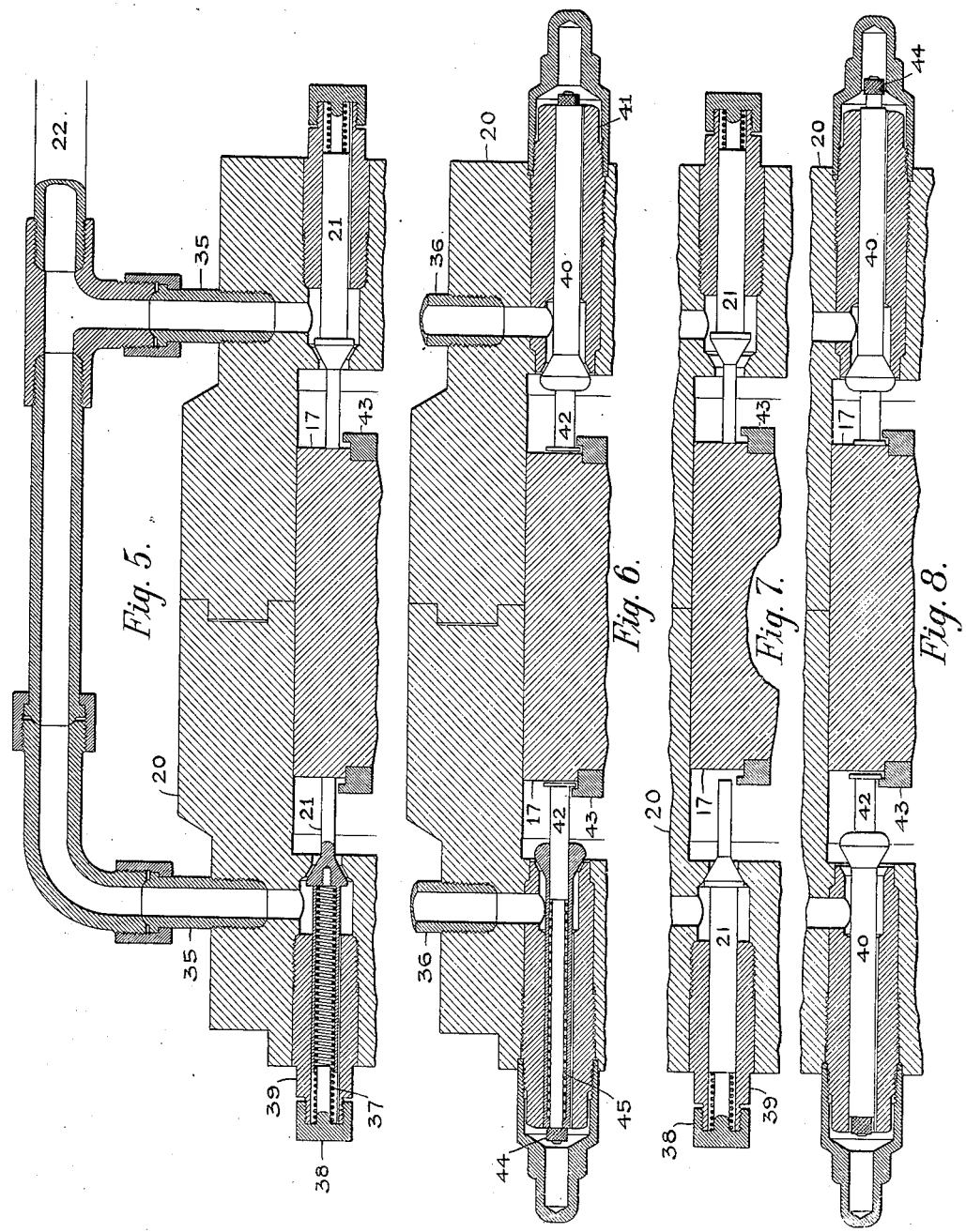
WITNESSES:
INVENTOR
Albert H. Emery
BY
ATTORNEYS.

No. 895,991. PATENTED AUG. 11, 1908.
A. H. EMERY.
HYDRAULIC PRESSURE MEASURING APPARATUS.
APPLICATION FILED AUG. 6, 1906.

8 SHEETS—SHEET 6.

Witnesses
H. C. Totten
J. M. Wynkoop

Inventor
Albert H. Emery
By Knight Bros.
Attorneys.

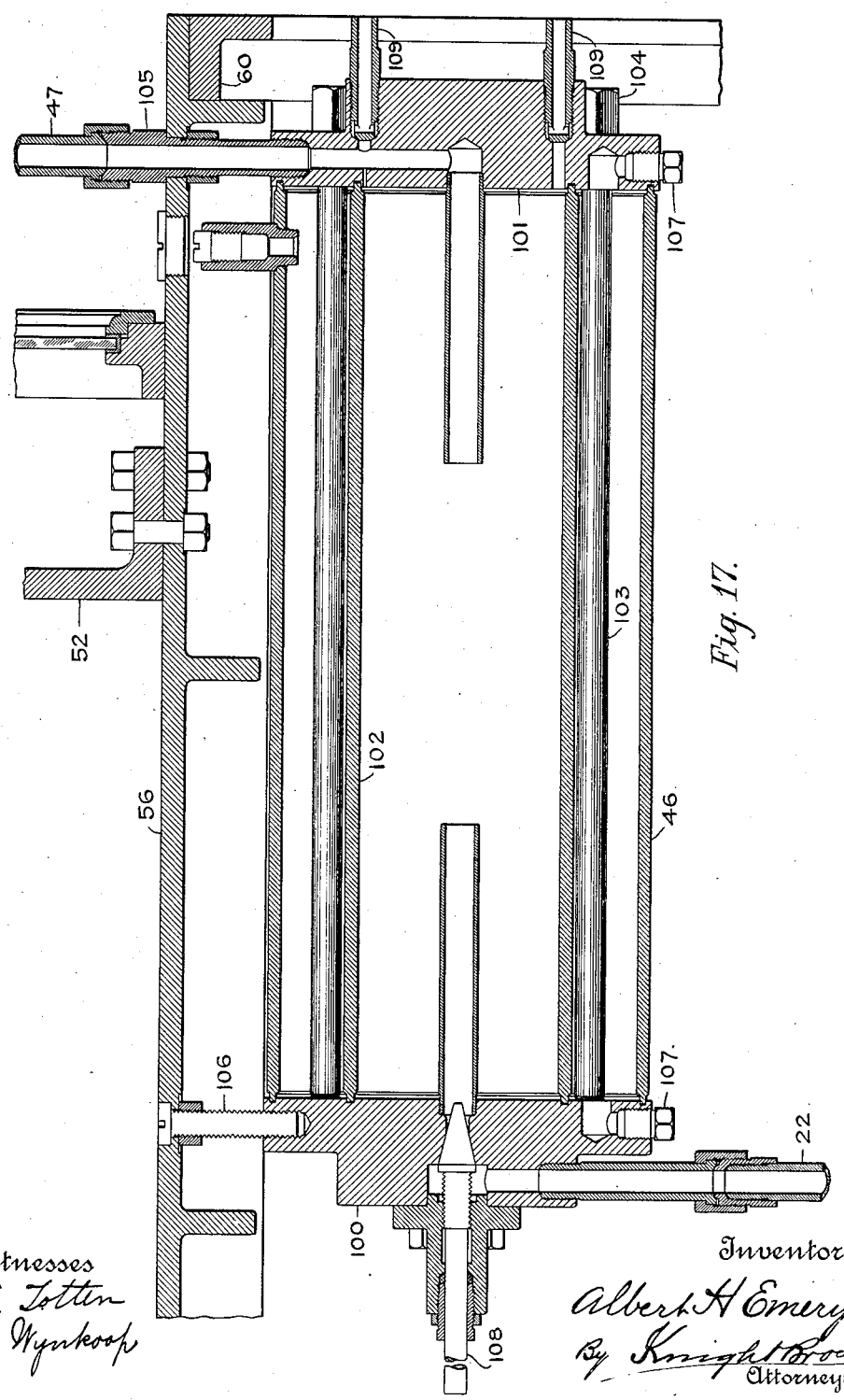

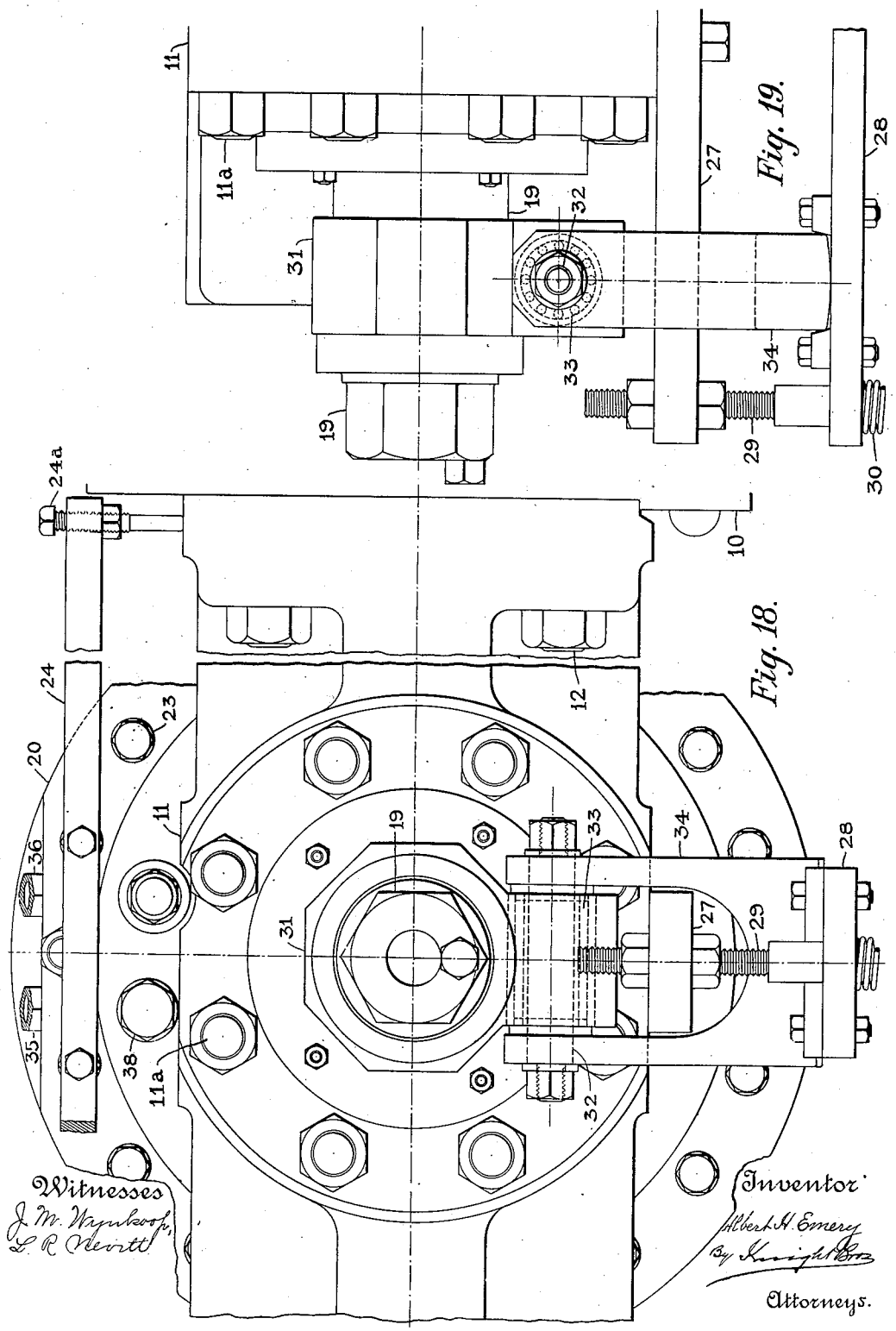

UNITED STATES PATENT OFFICE.

ALBERT H. EMERY, OF STAMFORD, CONNECTICUT.

HYDRAULIC-PRESSURE-MEASURING APPARATUS.

No. 895,991.  Specification of Letters Patent.  Patented Aug. 11, 1908.

Application filed August 6, 1906. Serial No. 329,440.

*To all whom it may concern:*

Be it known that I, ALBERT HAMILTON EMERY, a citizen of the United States, and a resident of Stamford, in the county of Fairfield and the State of Connecticut, have invented certain new and useful Improvements in Hydraulic-Pressure-Measuring Apparatus, of which the following is a specification.

Figure 9:
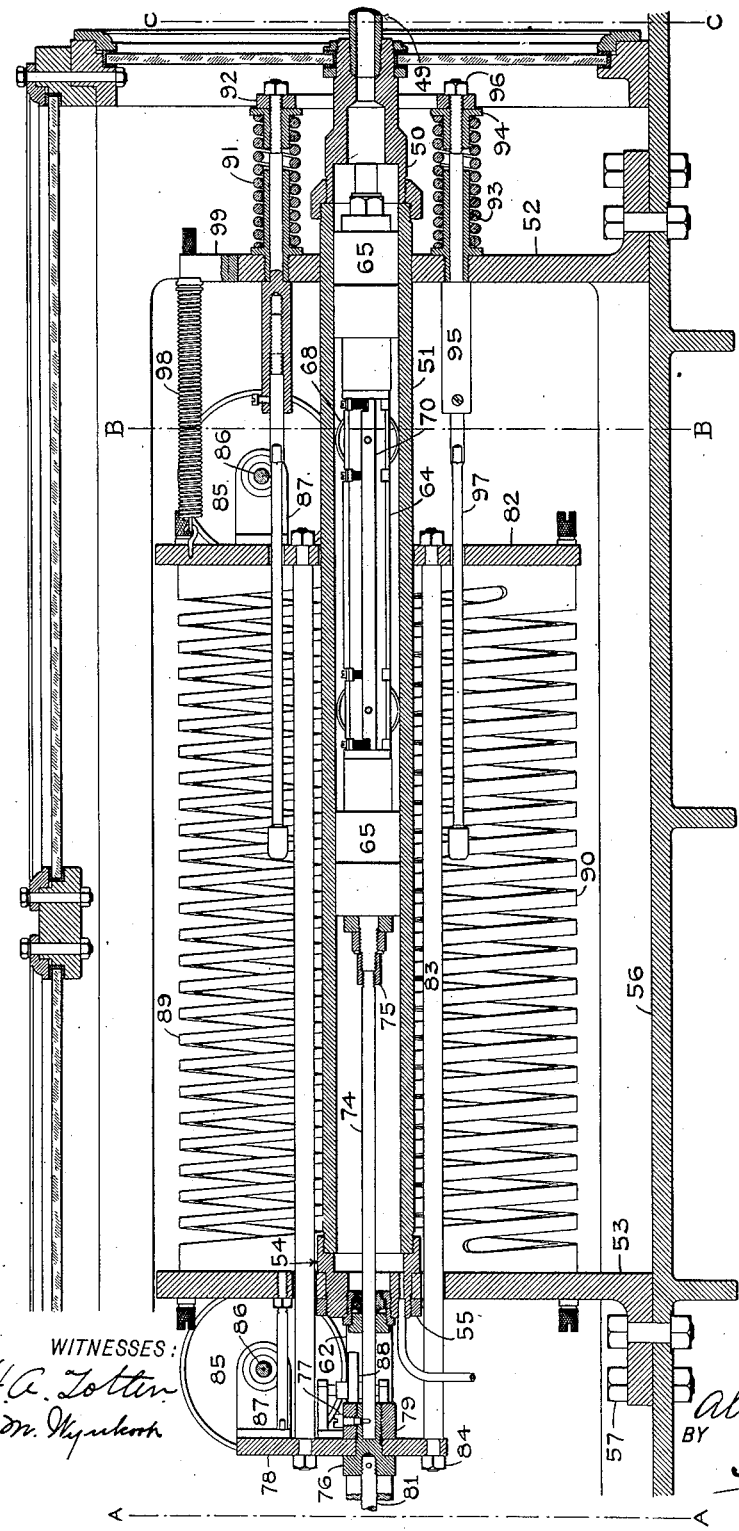
Figure 10:
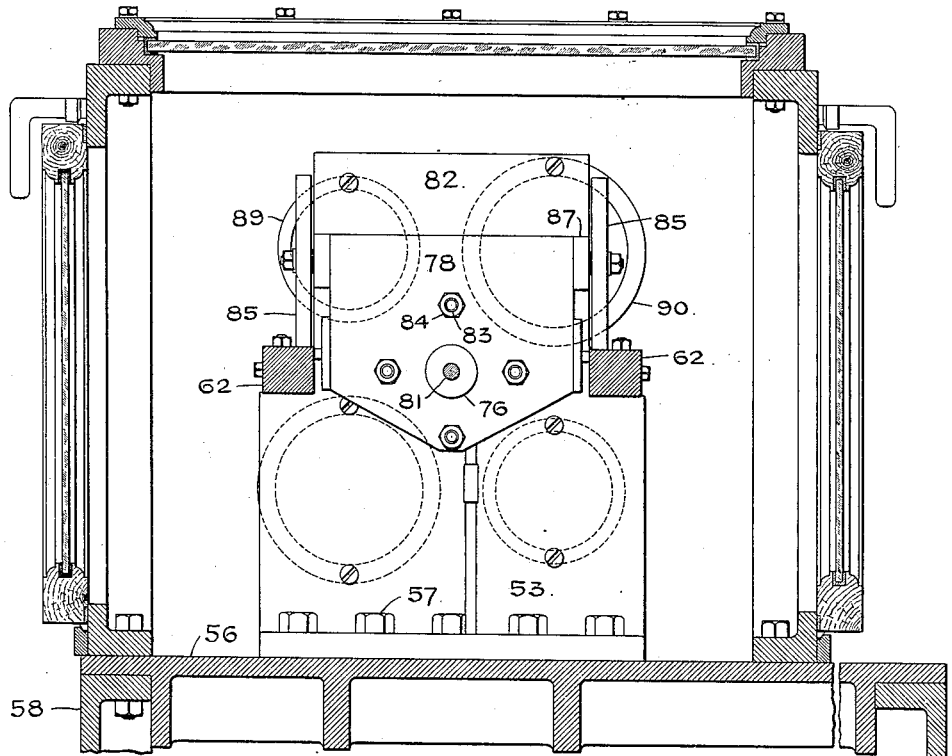
Figures 11, 12:
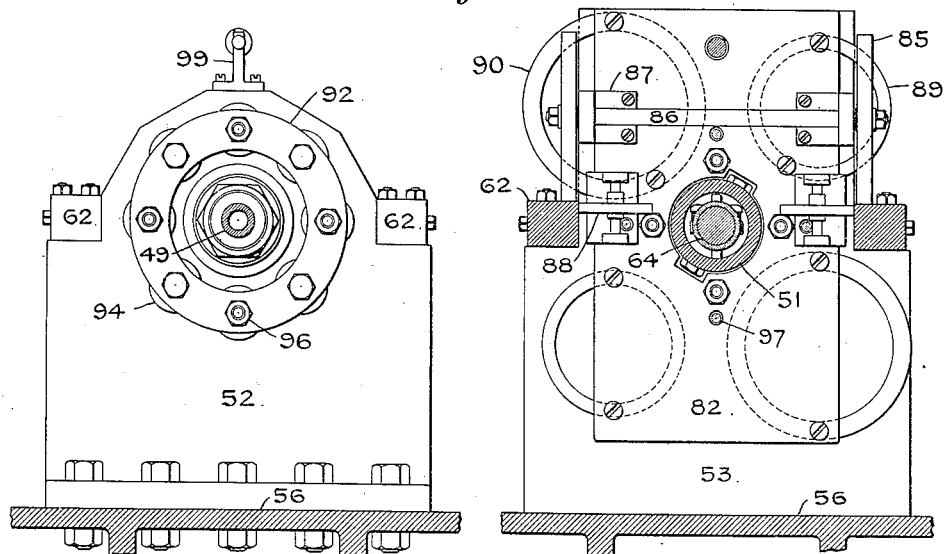
Figure 13:
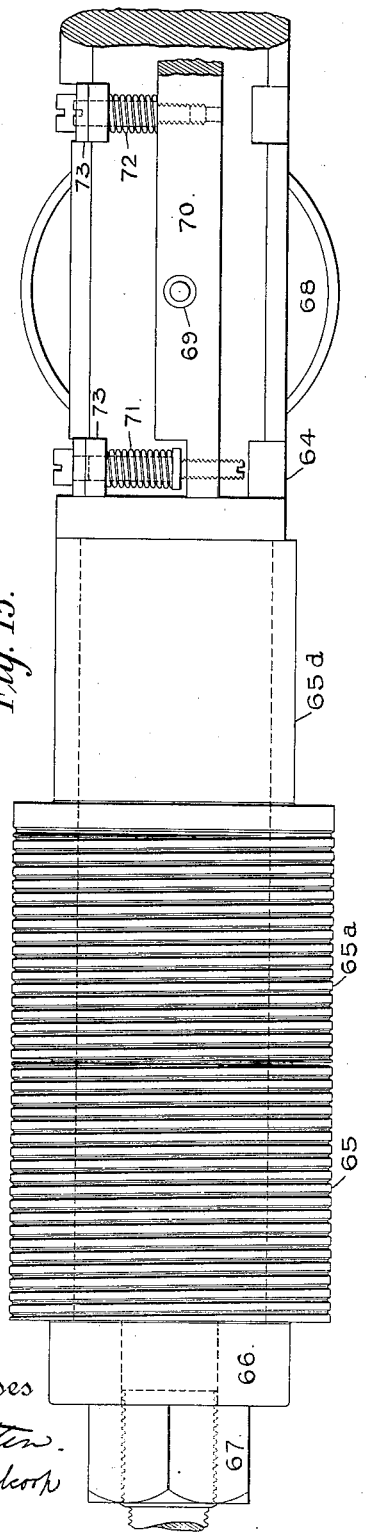
Figure 14:
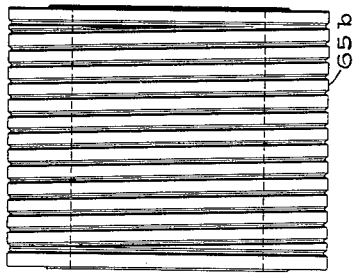
Figure 15:
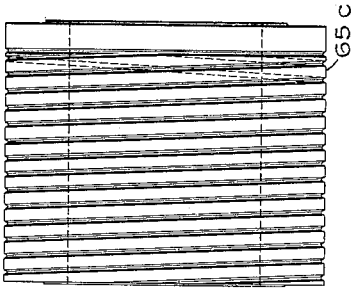
Figure 16:
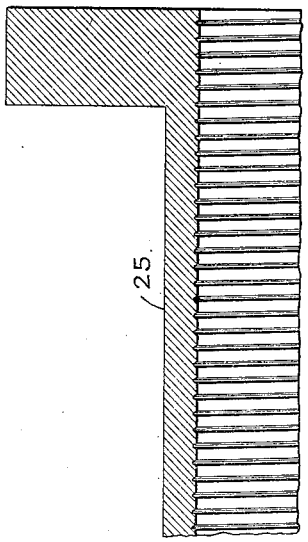

This invention relates to methods of measuring with great exactness loads or pressures put upon liquids, and is especially applicable to dynamometers and pressure gages. I have here shown it applied to a car dynamometer shown in 19 figures of the drawings, in which:

Figure 1 shows a plan of a car dynamometer assembled to the frame-work of the car; Fig. 2 shows a side elevation of the dynamometer and part of the framework of the car, some parts being in section; Fig. 3 shows a plan of one-half of the main press of the dynamometer attached to the framework of the car; Fig. 4 is a sectional view of the main press of the dynamometer and some of the car frame, showing a coupling which couples the piston rod of the press to an extension of the draw-bar, and showing the pipe leading to the measuring and recording part of the dynamometer. The valves and pipes shown in the upper part of the view are behind the general plane of the section, while the valves shown in the lower half are actually opposite those in the upper part of the cylinder and in front of the general plane of the section. Figs. 5, 6, 7 and 8 show these valves to a larger scale. Fig. 5 shows a section of part of the main press, cylinder and piston, and of the valves and pipe connecting with the measuring and recording cylinder of the dynamometer, with the piston in a central position; Fig. 6 shows a section of part of the main press, cylinder and piston and of the valves connecting the supply-tank, with the piston in a central position; Fig. 7 is similar to Fig. 5, but shows the piston moved away from the central position, and the valves, one closed and the other open; Fig. 8 is similar to Fig. 6, but with the piston moved away from its central position, and the valves, one open and the other closed; Fig. 9 shows a longitudinal section of the measuring and recording part of the dynamometer; Figs. 10, 11 and 12 show cross-sections of the measuring and recording part of the dynamometer, with some of the parts removed, the sections being taken on lines $a\,a$, $b\,b$, and $c\,c$, Fig. 9, respectively; Fig. 13 shows a side elevation of some of the pistons and part of the arbor which works in the cylinder of the measuring and recording part of the dynamometer; Figs. 14 and 15 are views of some of the pistons, showing methods of grooving; Fig. 16 shows in section a portion of one of the bushings (see Fig. 4) around the main piston rod in the main press cylinder, and shows the form of grooving; and Fig. 17 shows the section of a chamber through which the liquid passes in going from the main press to the measuring and recording cylinder. This chamber is inclosed in another, to be used in cooling the liquid, if necessary. Fig. 18 shows an end elevation of the housing and many of the principal parts. Fig. 19 shows a side elevation of one of the rocking supports, which support the piston rod and piston on a spring-supported bar, and also shows some of the parts adjacent thereto.

In the figures: 1 are plates running lengthwise of the car, from end to end, forming the sides of a box girder, of which plates 2 and 3 form part of the top and bottom, at either end of a centrally reinforced portion of this girder, which portion contains the main hydraulic press of the dynamometer.

4 and 5 are the bottom plates of this reinforced portion.

6, 7 and 8 are cross members in the girder. 6 and 8 form the ends of the reinforced portion.

9 are two longitudinal plates riveted to 1, 6, 7 and 8, reinforcing 1, and 10 are plates riveted to 1 and 9, on each of which a ledge is planed, on which rest the main housing 11 bolted to these plates 10 by bolts 12. This housing transmits all the load from the drawbar to the frame of the car.

13 is a portion of the drawbar and has on it shoulder 13ª and collar 14, which limit its motion in either direction by striking bosses on cross member 8. The load in either direction on the drawbar 13 is transmitted through the initially loaded springs 15 to the main piston rod 16 which carries on it a piston 17, held in place by sleeve 18 and sleeve nut 19. This piston 17 closely fits into the two-part cylinder 20, which is held securely in position by the housing 11 and stud bolts 11ª, and longitudinal loads on the piston rod 16 are transmitted to the liquid between the piston and one head of the cylinder 20 and so to the housing 11 and car body, the liquid under pressure passing through one of the valves 21 to the pipe 22 which leads to the measuring and recording part of the machine. Bolts 23 hold the two halves of the cylinder together and two spring bars 24 carry the weight of the cylinder and piston in assembling. They are secured to the cylinder 20 by two horizontal screws in each, as shown in plan and elevation, but not numbered. These bars 24 and cylinder 20, to which they are attached, are supported by four vertical screws 24ª, two in each bar; shown in plan in Fig. 3 and elevation in Fig. 18 at the ends of the bars. These screws rest on the housing 11, and are screwed down until the deflected bars raise the cylinder until its axis is exactly in line with the axis in the hole in the housing so the weight of the cylinder will not come on the bushings 26 and distort them.

25 are bushings in the half-cylinders and 26 are similar bushings which extend through the cross-pieces of the housing into the cylinder and center the cylinder with the housing. These bushings are best made of bronze.

27 are bars bolted to the under side of the housing 11 and carry track bar 28 by rods 29 and springs 30.

31 are collars on the piston rod 16 and sleeve nut 19, and 32 are axles running in roller bearings 33 in these collars 31.

34 are rocking supports on axles 32, and they rest and roll on track bar 28, as the piston moves backwards and forwards, so that the weight of the piston rod 16 and attached parts, instead of resting upon the bushings 25 and 26 is substantially carried on the roller bearings and the friction and wear thus greatly reduced.

Nipples 35, Fig. 5, lead to the pipe 22, which leads to the measuring and recording end of the dynamometer, while nipples 36, Fig. 6, lead to a similar pipe, which leads to supply-tank. Valves 21 seat in the two halves of the cylinder, and each is held against its seat or with its stem against the piston 17 by spring 37 working against cap 38, the valves being guided by their cases 39. Valves 40 seat in their cases 41 which screw into the halves of the cylinder, and these valves close the passage leading from the cylinder to the supply tank, which is not shown but which is located in a convenient position above the axis of the recording cylinder. Valve stems 42 have flanges on their ends which hook onto a flange on rings 43 which are fastened to piston 17. These valve stems 42 have a nut 44 on the other end, holding the valve on to its stem. Springs 45 hold the valve stems against nut 44, or the valves against their seats in cases 41.

When the piston is in its central position, all four valves are open, as shown in Figs. 5 and 6, but when the piston 17 moves to the right, as shown in Figs. 7 and 8, one valve, 21, closes, and valve 40, on the same side of the piston, opens, while valve 21, on the other side of the piston, is forced further open, and valve 40, on that side closes; thus, the side of the piston which has approached its cylinder head is open to the recording cylinder of the dynamometer and closed to the supply-tank, and the other side of the piston is open to the supply-tank and closed to the recording-cylinder. The position of all these valves is reversed when the piston moves to the left. With these arrangements of the valves, a constant portion of the load on the piston in either direction is always transmitted to the measuring and recording cylinder, that portion being the ratio of the acting area of the main press piston to the area of the recording cylinder.

Pipe 22 leads from the two-part cylinder 20 to the chamber 46, and pipe 47 leads to elbow 48 in which is screwed nipple 49, which also screws into cylinder head 50. (See Fig. 2.) Recording cylinder 51 is supported by bracket 52 at one end, and is fastened to bracket 53 by its head 54 and nut 55 at the other. These brackets 52 and 53 are bolted to table top 56 by bolts 57, and 56 is carried by two side frames 58 (see Fig. 2) and end frames 59 and 60, resting on the box girder which forms the backbone of the car. Frame 59 also carries table 61, which carries the paper on which the record is made. The mechanism for moving the record paper is not shown. Track bars 62 rest on and connect the two brackets 52 and 53 and are also supported at one end by studs 63. In recording cylinder 51 is an arbor 64 carrying four close fitting pistons 65.

The main press cylinder 20 and the recording cylinder 51 are each very carefully ground and lapped true, and the pistons to work therein very carefully ground and lapped to fit closely therein. They must not be so tight as to give much friction, but to avoid leakage, the clearance is very small and the weight of the piston or imperfections of the work will usually cause the clearance to be more on one side than on the other and the liquid under pressure flows more rapidly into the greater clearance, causing a thrust of the piston against the side of the cylinder opposite the greater clearance, which thrust causes friction and wear and brings error into the measurements. To avoid this side pressure, the clearance should be kept uniform on all sides, so that the fluid pressure will be uniform all around the piston. This may be very perfectly accomplished by the use of spiral grooves which are clearly shown in Figs. 13 to 15 inclusive. These balancing grooves may be placed on the interior of the cylinder, as shown on piece No. 25 (see Figs. 4 and 16). The pistons 65 are provided with these exterior spiral grooves which may run from one end to the other, as shown on piston 65, Fig. 13, or which may start in a circular groove near one end and run to the other end, as seen on 65$^a$, Fig. 13. The part which is not grooved may be very slightly conical, tapering towards the end of the piston. This taper is not enough to show on the drawing. The spiral groove may connect two circular grooves, one near either end of the piston, as shown on 65$^b$, Fig. 14. The piston will be more perfectly balanced by having one or more pairs of spiral grooves, the two grooves forming a pair, starting diametrically opposite to each other. A piston with one pair is shown in 65$^c$, Fig. 15. The main piston 17 is also provided with these spiral grooves which are not shown in the drawing. These pistons 65 are placed on the ends of arbor 64, and held in place by collar 66 and nut 67. Sleeve 65$^d$ may be removed from this arbor and pistons substituted therefor, to further reduce the leakage. Wheels 68 have axles running in bushings 69 in side bar 70, and carry the weight of the pistons and arbor through the springs 71 and 72, working between side bars 70 and cross-pieces 73, which are fastened to the top face of the arbor. These springs enable the wheels to carry the weight of the arbor, etc., and reduce the friction and wear by nearly equalizing it around the cylinder.

Piston rod 74 is screwed into nut 75, and against the end of the arbor 64, at one end, and slips into the piece 76 at the other. Piece 76 which fits in the hole in crosshead 78 is secured in place by nut 79, which carries rod 81, which carries the pen for making the record on the paper moving over the paper-table 61. This crosshead 78 is fastened to crosshead 82 by four shouldered bars 83 and nuts 84, the bars passing through clearance holes in bracket 53; all forming a truck which is carried by wheels 85 on shafts 86, the shafts running in ball bearings in brackets 87, fastened to crossheads 78 and 82. Wheels 85 roll on track bars 62 and carry the weight of the truck and attached parts, while similar wheels 88 carry any side load that may occur.

Helical compression springs 89 and 90 are fastened at one end to bracket 53 and at the other to crosshead 82 which moves with the piston 65, and these springs resist the motion of the crosshead, and thus the motion of the pistons; and as all the load on the pistons is transmitted to these springs, the amount of their compression is a measure of that load.

91 are initially loaded buffer springs acting between the bracket 52 and ring 92, being held in place by pieces 93 and 94, their load being held by the shouldered bars 95 and nuts 96. Thus, normally, they simply hold these bars 95 against the bracket 52. Long rods 97 screw into bars 95 and project through cross head 82 and have enlarged heads against which crosshead 82 strikes when it reaches a desired amount of motion, and its further motion is then resisted by buffer springs 91, as well as by the measuring springs 89 and 90. These measuring springs 89 and 90 may be of any suitable form of tension or compression springs of uniform rate fastened so as to resist the motion of the pistons, but are preferably compression springs having nearly rectangular section made by taking a spiral cut through the wall of a hollow cylinder, from near one end nearly to the other, leaving a solid ring of metal at each end. Should a pair of these springs 89 or 90 give too little resistance, a supplementary spring 98 may be used, which spring is fastened to crosshead 53 and to support 99, which is secured to bracket 52. This spring increases the rate of the measuring springs by the desired amount. The measuring springs 89 or 90 are made in pairs, one right and one left, and one or more pairs are used at a time to give the desired value to the pressure ordinates, corresponding to the movements of the pistons.

Pieces 100 and 101, Fig. 17, form the heads of the tank 46 and in conjunction with piece 102 form an inner chamber through which the liquid passes on the way from the main press to the recording cylinder. The heads 100 and 101 are securely held against the ends of the pieces 46 and 102 by bolts 103 and nuts 104. This tank 46 is held in place by pipe 105 and bolt 106. Plugs 107, close the openings into the outer chamber and by replacing them with pipes, liquid can be circulated into this outer chamber to cool or warm the contents of the inner chamber. A valve 108 is used to cut off the flow of the liquid from the main press to the recording cylinder, but is open when the dynamometer is in use, and it is used to throttle the flow of the liquid and thus prevent unduly rapid motion of the recording apparatus. Plug valves 109 allow the liquid to be drawn from the inner chamber at any time, without disturbing the rest of the apparatus.

Having thus described my invention, what I claim and desire to secure by Letters Patent is:

1. In a dynamometer, in combination with the housing, the cylinder, and piston contained in said cylinder, the bars 24 and adjusting screws 24$^a$ in the ends thereof, supporting the cylinder and its contained piston in said housing.

2. In a dynamometer, the combination with a housing, and the contained cylinder, of the bushings 26 centered in the two ends of the housing and projecting into the cylinder, securely fixing the axis of the cylinder central with the holes bored in the housing for these bushings.

3. In a dynamometer, the combination with a housing, and its contained cylinder, piston, and piston rod, and outer bushings 26 centered in the housing and projecting into the cylinder; of the inner bushings 25, registering therewith.

4. In a hydraulic measuring apparatus, the combination of the cylinder and piston having opposed cylindrical bearing surfaces, one of which parts is constructed with a fine spiral fluid-conduit in its cylindrical surface which establishes communication between different points on said surface, and tends to equalize at diametrically opposite points, pressure due to leakage of the pressure-fluid between the surfaces.

5. In a hydraulic measuring apparatus, a pressure piston constructed with a pair of equidistant, fine, spiral grooves, starting at diametrically opposite points in a plane normal to the axis of the piston and extending at the same pitch around a portion of its exterior, and tending to equalize at diametrically opposite points, the pressure of the liquid leaking around the piston.

6. In a hydraulic measuring apparatus, a pressure piston constructed with a circular groove near one end thereof and a fine, spiral groove around a portion of its exterior leading from the circular groove and tending to equalize at diametrically opposite points, the pressure of the liquid leaking around the piston.

7. In a hydraulic measuring apparatus, a pressure piston constructed with a pair of circular grooves near the ends thereof and a fine spiral groove connecting said circular grooves for the purpose set forth.

8. In a hydraulic measuring apparatus, a pressure piston constructed with a circular groove near one end and a pair of diametrically opposite fine spiral grooves leading from said circular groove and extending toward the opposite end of the piston.

9. In a hydraulic measuring apparatus, a pressure piston constructed with a pair of circular grooves near the ends thereof and a pair of diametrically opposite fine spiral grooves connecting said circular grooves.

10. In a hydraulic measuring apparatus, the combination with the pressure piston rod, of the bushing surrounding said piston rod constructed with a fine spiral groove on its interior, for the purpose set forth.

11. In a hydraulic measuring apparatus, the combination of the cylinder, the pressure piston and piston rod working therein, a rolling support for said piston and piston rod, and means for carrying the weight of said piston and rod, through the rolling support.

12. In a hydraulic measuring apparatus, the combination with a cylinder, a piston, a piston rod, and a rolling sector 34; of a bar 28, and springs 30 to carry the weight of the piston, piston rod and parts carried thereby, for the purpose set forth.

13. In a dynamometer car, a large rectangular box below the floor of said car, forming part of the main girder of the car, in combination with the cylinder housing and the weighing cylinder of the dynamometer as explained.

14. In a hydraulic measuring apparatus, the combination with the cylinder, and its contained piston, of a valve 40, a rod 42, connected to the piston and adapted to engage the valve in the direction of unseating, a spring 45 through which said rod moves the valve in the direction of seating, whereby, when the piston is on one side of a certain position the valve remains closed through the action of the spring and piston, and when the piston is on the other side, of this certain position, the valve is positively held open by the piston through said rod.

15. In a hydraulic measuring apparatus, the combination with a cylinder, and its contained piston; of a pair of valves 40, passages controlled by said valves, and connections between said valves and the piston, comprising rods 42 connected with the piston and adapted to engage the valves in the direction of unseating, and springs through which the rods are adapted to move the valves in the directions of their seating; the lengths of these connections being such that at one part of the stroke of the piston, both valves are held open and at all other parts of said stroke, one valve is held open and the other held closed, substantially as explained.

16. In a hydraulic measuring apparatus, the combination with a cylinder, and its contained piston, of a pair of inlet valves 40, a pair of outlet valves 21 and means through which all of said valves are held open by the piston at one part of its stroke, as and for the purposes explained.

17. In a hydraulic measuring apparatus, the combination with the recording cylinder, and the main weighing cylinder connected therewith; of an interposed settling tank through which the liquid passes on its way from one of said cylinders to the other.

18. In a railway-car dynamometer, the combination with the weighing cylinder and the recording cylinder connected therewith; of a throttling valve interposed in the connection between said cylinders to prevent too rapid flow of liquid through said passage.

19. In a hydraulic measuring apparatus, the combination with the recording cylinder, and the main weighing cylinder connected therewith; of an interposed settling tank through which the liquid passes on its way from one of said cylinders to the other; one head of said tank containing the passage leading from the main cylinder into this tank and supporting a valve to throttle or close said passage.

20. In a hydraulic measuring apparatus, the combination with the recording cylinder, and the main weighing cylinder connected thereto; of an interposed tank through which the liquid passes on its way from one cylinder to the other, and means for regulating the temperature of liquid in said tank.

21. In combination with a pressure indicating cylinder, two groups of pistons, and a common piston rod by which said pistons are carried; said groups of pistons being separated a suitable distance, to better support and guide the rod which transmits the pressure on the pistons to the indicating apparatus.

22. In a hydraulic measuring apparatus, the combination with a cylinder and its contained pistons and piston rod; of wheels for carrying the weight of said pistons and piston rod, said wheels being placed between the pistons and rolling in said cylinder.

23. In a hydraulic measuring apparatus, the combination with a cylinder and its contained pistons and piston rod; of wheels rolling in said cylinder, for carrying the weight of said pistons and piston rod, and spring supported bearings for said wheels.

24. In a hydraulic measuring apparatus, the combination of a recording cylinder, a piston, a piston rod, a fixed abutment, a pair of moving cross-heads driven by the piston and rods connecting said cross-heads, and a resisting spring between the fixed abutment and one of the moving cross-heads.

25. In a hydraulic measuring apparatus, the combination of a recording cylinder 51, a piston rod with a piston, a fixed abutment 53, a moving cross-head 78 connected to said piston rod, a moving cross-head 82 connected to the cross-head 78 by rods 83; and a pair of compression springs between the fixed abutment 53, and the moving cross-head 82, to balance and measure the pressure on the pistons.

26. In a hydraulic measuring apparatus, the combination of a recording cylinder 51, a piston rod, a piston, a fixed abutment 53, moving cross-head 78 connected to said piston rod, and a moving cross-head 82 connected to the cross-head 78 by rods 83, a pair of compression springs between the fixed abutment 53 and a moving cross-head 82, to balance and measure the pressure on the piston, said springs being rigidly fixed at their ends to the abutment 53 and to the moving cross-heads 82, respectively.

The foregoing specification signed at Stamford this seventeenth day of July, 1906.

ALBERT H. EMERY.

In presence of—
C. POND WEBB,
MARTIN J. GRAY.